United States Patent
Fujita

(10) Patent No.: US 11,207,955 B2
(45) Date of Patent: Dec. 28, 2021

(54) FRONT DOOR

(71) Applicant: Toyota Jidosha Kabushiki Kaisha, Toyota (JP)

(72) Inventor: Kohei Fujita, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 186 days.

(21) Appl. No.: 16/361,950

(22) Filed: Mar. 22, 2019

(65) Prior Publication Data

US 2019/0299755 A1      Oct. 3, 2019

(30) Foreign Application Priority Data

Mar. 28, 2018   (JP) .............................. JP2018-062748

(51) Int. Cl.
   *B60J 5/04*     (2006.01)
   *B60J 10/74*    (2016.01)

(52) U.S. Cl.
   CPC ............ *B60J 5/0402* (2013.01); *B60J 10/74* (2016.02)

(58) Field of Classification Search
   CPC ............ B60J 5/0402; B60J 5/04; B60J 10/74
   See application file for complete search history.

(56) References Cited

U.S. PATENT DOCUMENTS

| | | | | |
|---|---|---|---|---|
| 4,969,295 A | * | 11/1990 | Nishikawa | B60J 5/0402 296/146.2 |
| 6,668,490 B2 | * | 12/2003 | Hock | B60J 5/0402 296/146.9 |
| 9,597,946 B2 | * | 3/2017 | Yokota | B60J 5/0402 |
| 10,259,297 B2 | * | 4/2019 | Osawa | B60J 5/0408 |
| 2010/0123336 A1 | * | 5/2010 | Eckart | B60J 1/10 296/201 |
| 2012/0124912 A1 | * | 5/2012 | Okada | B60J 5/0402 49/501 |
| 2017/0203638 A1 | | 7/2017 | Makita et al. | |
| 2020/0276890 A1 | * | 9/2020 | Kimura | B60J 5/04 |

FOREIGN PATENT DOCUMENTS

| | | |
|---|---|---|
| JP | 2015-224014 A | 12/2015 |
| JP | 2016-088247 A | 5/2016 |

* cited by examiner

*Primary Examiner* — Gregory J Strimbu
(74) *Attorney, Agent, or Firm* — Dinsmore & Shohl LLP

(57) ABSTRACT

A front door includes: a door body; a door sash configuring a window frame; a window disposed in the window frame; and a pillar having an upper end connected to a front end of an upper sash of the door sash, the upper sash supporting an upper edge of the window, the pillar having a lower portion fixed to the door body. The pillar includes a frame portion extending downward from a connection position between the upper sash and the pillar. A window supporting portion is coupled to the frame portion above the door body so as to extend frontward from the frame portion. The window supporting portion is located more frontward than the frame portion as the window supporting portion is located more downward. A front end of the window is supported by the window supporting portion at a position more frontward than the frame portion.

3 Claims, 4 Drawing Sheets

FRONT DOOR

CROSS-REFERENCE TO RELATED APPLICATIONS

This application claims priority to Japanese Patent Application No. 2018-062748 filed on Mar. 28, 2018, which is incorporated herein by reference in its entirety including the specification, drawings and abstract.

BACKGROUND

1. Technical Field

The present disclosure relates to a front door.

2. Description of Related Art

As described in Japanese Patent Application Publication No. 2016-88247, a front door assembled to a vehicle body includes a door body, a door sash attached to the door body, and a window. The front door is assembled to a vehicle body so as to be operable and closeable with hinges. The door sash configures a window frame. The door sash includes a pillar sash supporting a rear edge of the window, an upper sash supporting an upper edge of the window, and a lower sash supporting a front edge of the window. The lower sash includes a frame portion having a closed sectional shape and a channel portion supporting the window. A clearance distance between the frame portion and the channel portion is constant across the entire length in the extending direction of the lower sash. This means that the positional relationship between the frame portion and the channel portion is constant.

SUMMARY

Meanwhile, the hinges are fixed to the front wall of the front door. Since the frame portion of the lower sash should be avoided from coming in contact with the vehicle body when the front door is opened and closed, the frame portion cannot be disposed more frontward than the hinge. This means that the frame portion of the lower sash is restricted in its positional relationship by the hinge. In order to secure a space for fixing the hinge, the front wall of the front door is located more rearward than the front end of the front door. Hence, the frame portion of the lower sash is connected to a position more rearward than the front end of the front door. The position of the channel portion relies on the position of the frame portion, so that a gap might be generated between the door sash and a vehicle body if the positon of the frame portion is located more rearward than the front end of the front door. Therefore, for the sake of improving design property of the front door, there is a case that it is necessary to provide an accessory component used for filling the gap, a bracket used for fixing the accessary component, and others.

The present disclosure provides a front door that eliminates necessity of providing an accessory component between the front door and a vehicle body.

An aspect of the disclosure provides a front door including: a door body; a door sash provided above the door body and configuring a window frame; a window disposed in the window frame; a weather strip disposed between the window frame and the window; and a pillar having an upper end connected to a front end of an upper sash of the door sash, the upper sash supporting an upper edge of the window, the pillar having a lower portion fixed to the door body. The pillar includes a frame portion extending downward from a connection position between the upper sash and the pillar, and a window supporting portion coupled to the frame portion above an upper end of the door body so as to extend frontward from the frame portion, the window supporting portion being located more frontward than the frame portion as the window supporting portion is located more downward. A front end of the window is supported by the window supporting portion at a position more frontward than the frame portion.

According to the above aspect, even when the frame portion of the pillar is disposed so as to extend downward between the upper sash and the upper end of the door body, the window supporting portion supporting the window is located more frontward than the frame portion as the window supporting portion is located more downward. Hence, compared with the case in which the positional relationship between the frame portion and the window supporting portion is constant and the position of the window supporting portion relies on the position of the frame portion, the window can be extended to a more frontward position along the window supporting portion. Accordingly, a gap is unlikely to be generated between the front door and the vehicle body, and thus it is unnecessary to provide an accessory component between the front door and the vehicle body so as to fill the gap therebetween and a bracket used for fixing the accessary component.

In the above aspect, the pillar may include: a first panel that has a first frame portion configuring a part of the frame portion; and a second panel that has a second frame portion configuring a part of the frame portion, the second panel joined to the first panel such that the second frame portion is disposed facing the first frame portion. Above the upper end of the door body, a joint portion between the first panel and the second panel may face the weather strip.

This configuration makes the joint portion between the first panel and the second panel inconspicuous from the outside. Accordingly, the design property of the front door can be enhanced.

In the above aspect, the first panel may include a coupling portion that couples the first frame portion to the window supporting portion, and the second panel may be joined to the coupling portion at a position above the upper end of the door body.

According to this configuration, at a position above the upper end of the door body, it is possible to suitably carry out the joint between the first panel and the second panel.

In the above aspect, the second panel may include an extended portion extending in a front-rear direction at a position lower than the upper end of the door body, and the extended portion may be joined to the first panel such that the frame portion is formed in a closed sectional shape.

According to this configuration, the frame portion having a closed sectional shape can be configured by the first panel and the second panel. Accordingly, it is possible to increase rigidity of the frame portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

One embodiment of a front door will be described, hereinafter. In the following description, frontward and rearward indicate frontward and rearward directions of a vehicle. Upward and downward indicate upward and downward directions of the vehicle, that is, an up-down direction in the vertical direction. Inward and outward indicate an inner side (vehicle cabin side) and an outer side of the vehicle.

Figure 1:
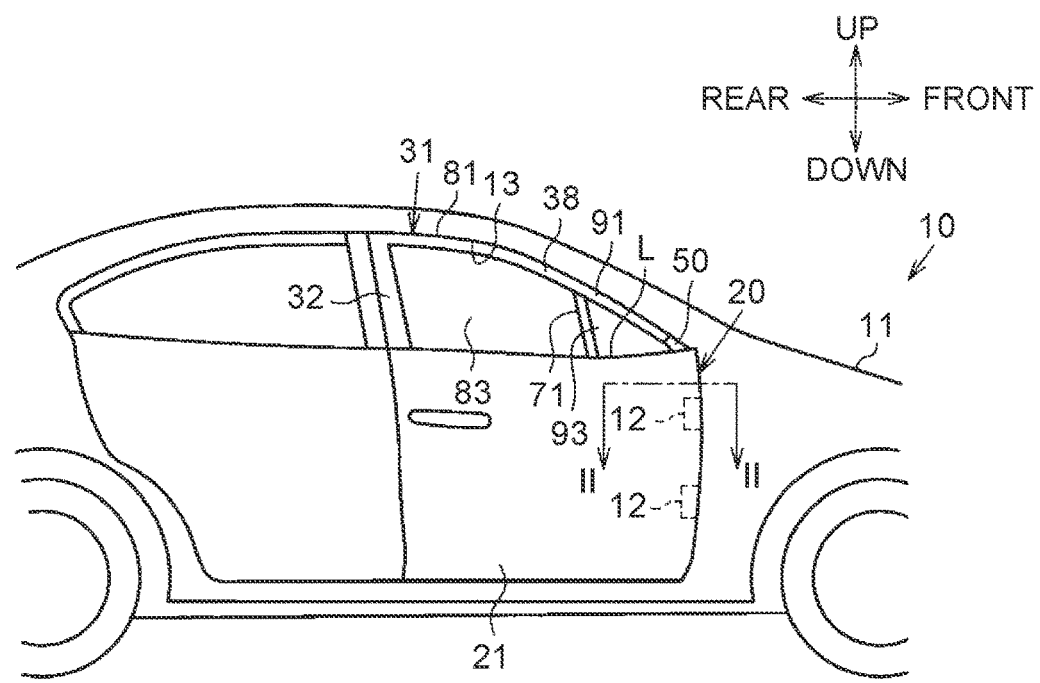
FIG. 1 is a side view of a vehicle.
Figure 2:
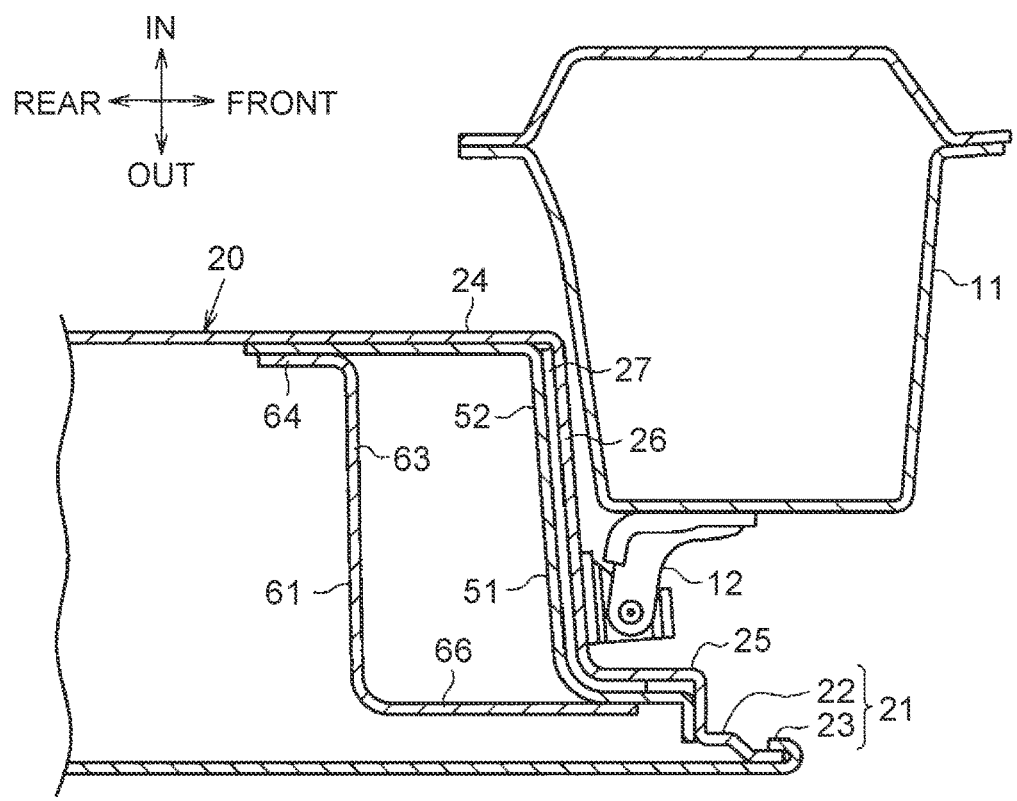
FIG. 2 is a sectional view taken along line II-II of FIG. 1, schematically showing an assembling manner of a front door to a vehicle body.

As shown in FIG. 1 and FIG. 2, a vehicle 10 includes: a vehicle body 11; a front door 20 assembled to the vehicle body 11; and hinges 12 fixed to the vehicle body 11 such that the front door 20 is openable and closeable. The vehicle body 11 includes a door opening part 13, and the front door 20 is assembled to the vehicle body 11 so as to close the door opening part 13.

The front doors 20 are assembled to both sides in the vehicle-width direction (right-left direction) of the vehicle 10. In the present embodiment, only the front door 20 on one side in the vehicle-width direction will be described, but the both front doors 20 in the vehicle-width direction have the same configuration.

Figure 3:
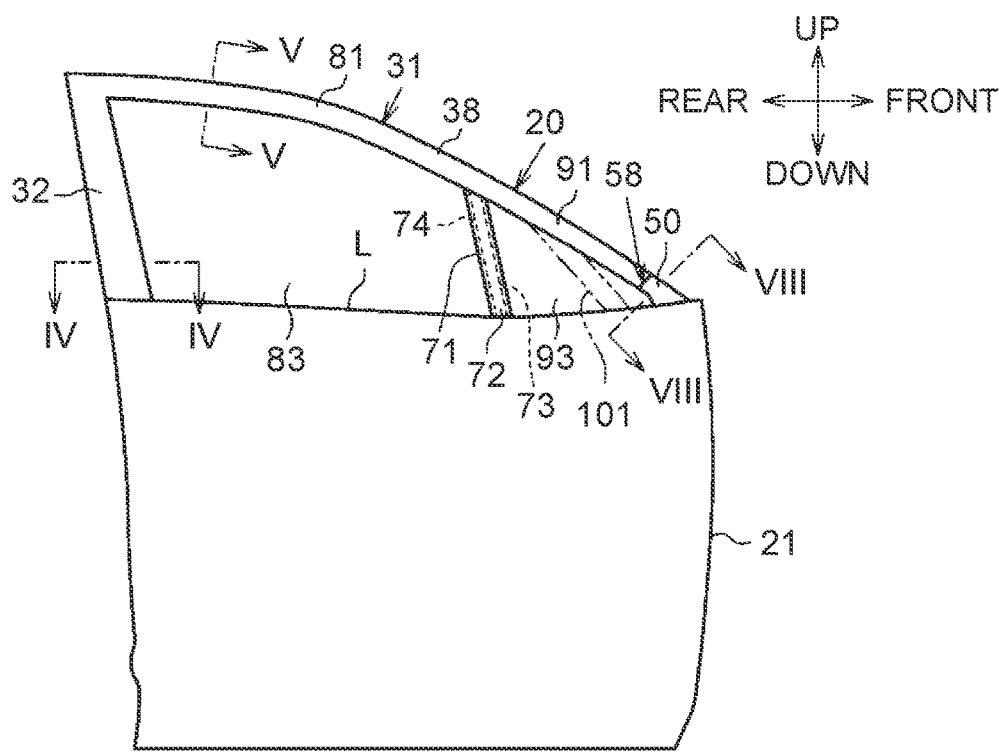
FIG. 3 is a front view schematically showing the front door.

As shown in FIG. 3, the front door 20 includes: a door body 21; a door sash 31 attached to the door body 21; a pillar 50 connecting the door sash 31 to the door body 21; a division bar 71 attached to the door body 21; a lifting window 83; and a fixed window 93.

As shown in FIG. 2, the door body 21 includes a metallic inner panel 22; and a metallic outer panel 23. The inner panel 22 includes a main body 24 provided to project from the outer panel 23 toward the inside of the vehicle, and a peripheral edge 25 provided to a peripheral edge of the main body 24. The peripheral edge 25 of the inner panel 22 and the outer panel 23 are joined to each other, to thereby form the hollow door body 21. The inner panel 22 configures a part on the inner side of the front door 20, and the outer panel 23 is configures a part on the outer side of the front door 20. The hinge 12 is fixed to a hinge reinforcement 27 with a front wall 26 of the main body 24 interposed therebetween, and also to the vehicle body 11 (more specifically, a front pillar of the vehicle body 11).

Figure 4:
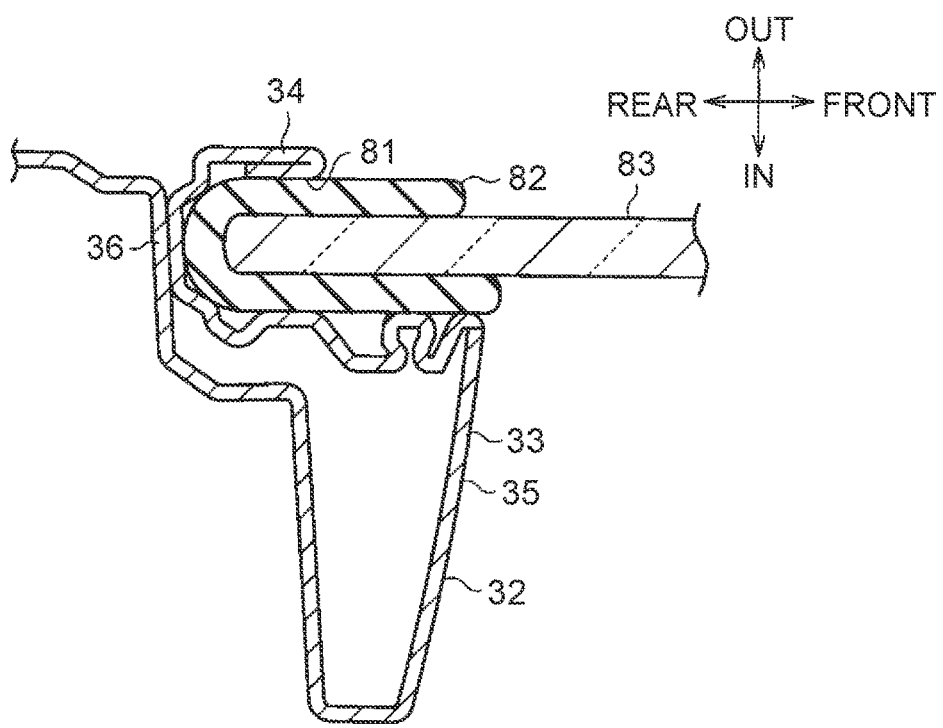
FIG. 4 is a sectional view taken along line IV-IV of FIG. 3, showing a rear sash and a lifting window supported by the rear sash.

As shown in FIG. 3 and FIG. 4, the door sash 31 is provided above the door body 21. The door sash 31 includes a rear sash 32 and an upper sash 38. The rear sash 32 is disposed more rearward than the upper sash 38. The rear sash 32 includes two sash panels 33, 34. The sash panels 33, 34 are produced by roll forming. The rear sash 32 includes a frame portion 35 in a closed sectional shape, and a channel portion 36. A lower end of the rear sash 32 is fixed to the door body 21. The rear sash 32 extends upward from the rear end of the door body 21.

Figure 5:
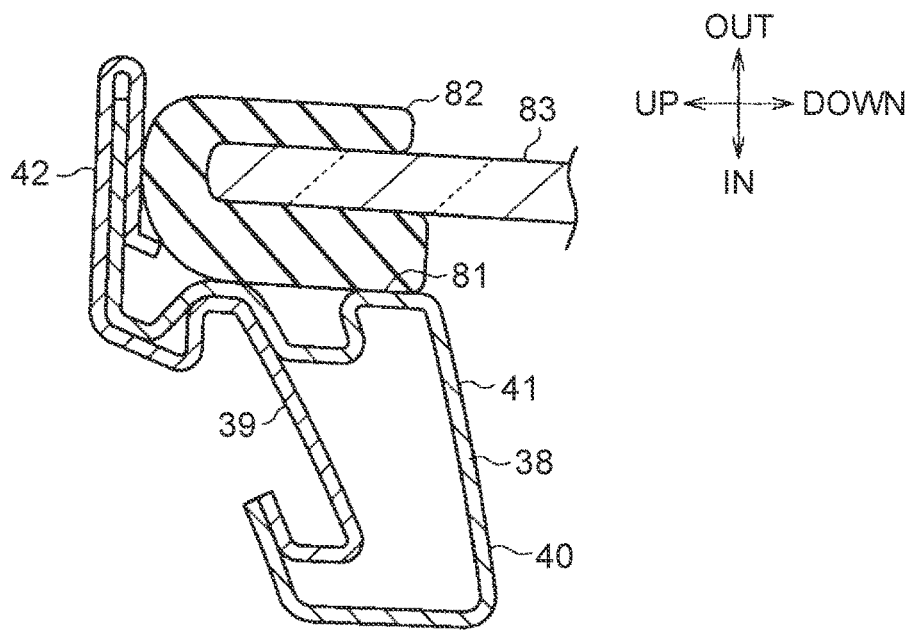
FIG. 5 is a sectional view taken along line V-V of FIG. 3, showing an upper sash and the lifting window supported by the upper sash.

As shown in FIG. 5, the upper sash 38 includes two upper sash panels 39, 40. The upper sash panels 39, 40 are produced by roll forming. The upper sash 38 includes a frame portion 41 having a closed sectional shape, and a channel portion 42. A clearance distance between the frame portion 41 and the channel portion 42 is constant across the entire length in the extending direction of the upper sash 38. The upper sash 38 extends from an upper end of the rear sash 32 toward a front end of the door body 21.

Figure 6:
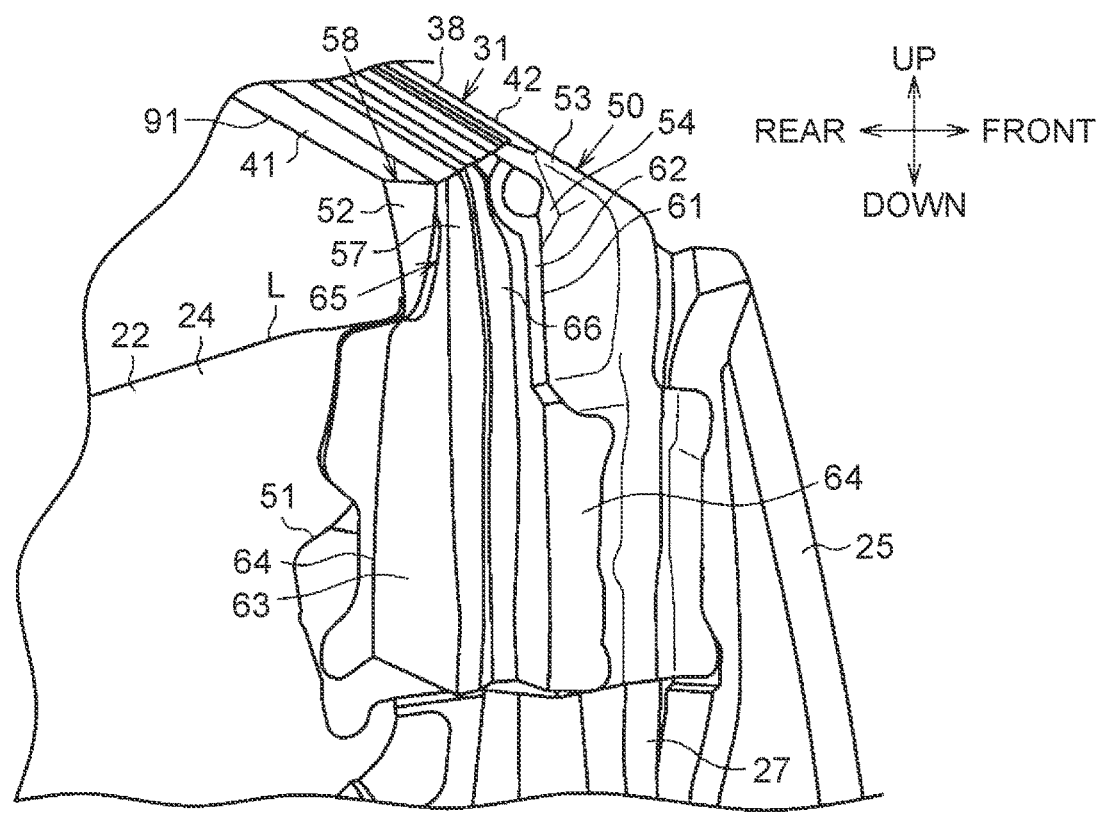
FIG. 6 is a perspective view of a pillar as seen from the outside of the front door.
Figure 7:
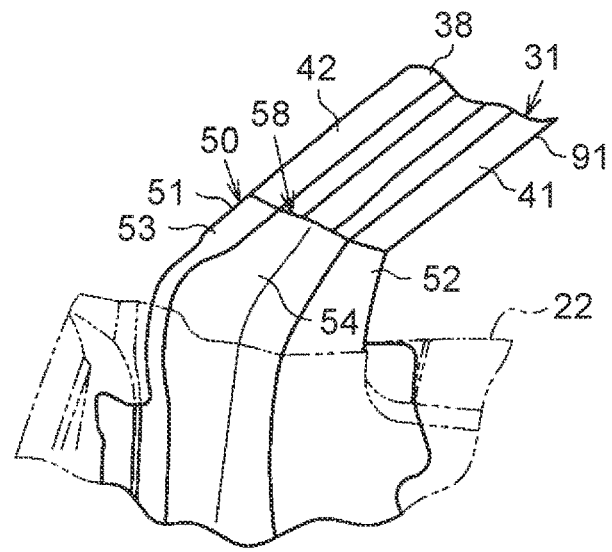
FIG. 7 is a perspective view of the pillar as seen front the inside of the front door.
Figure 8:
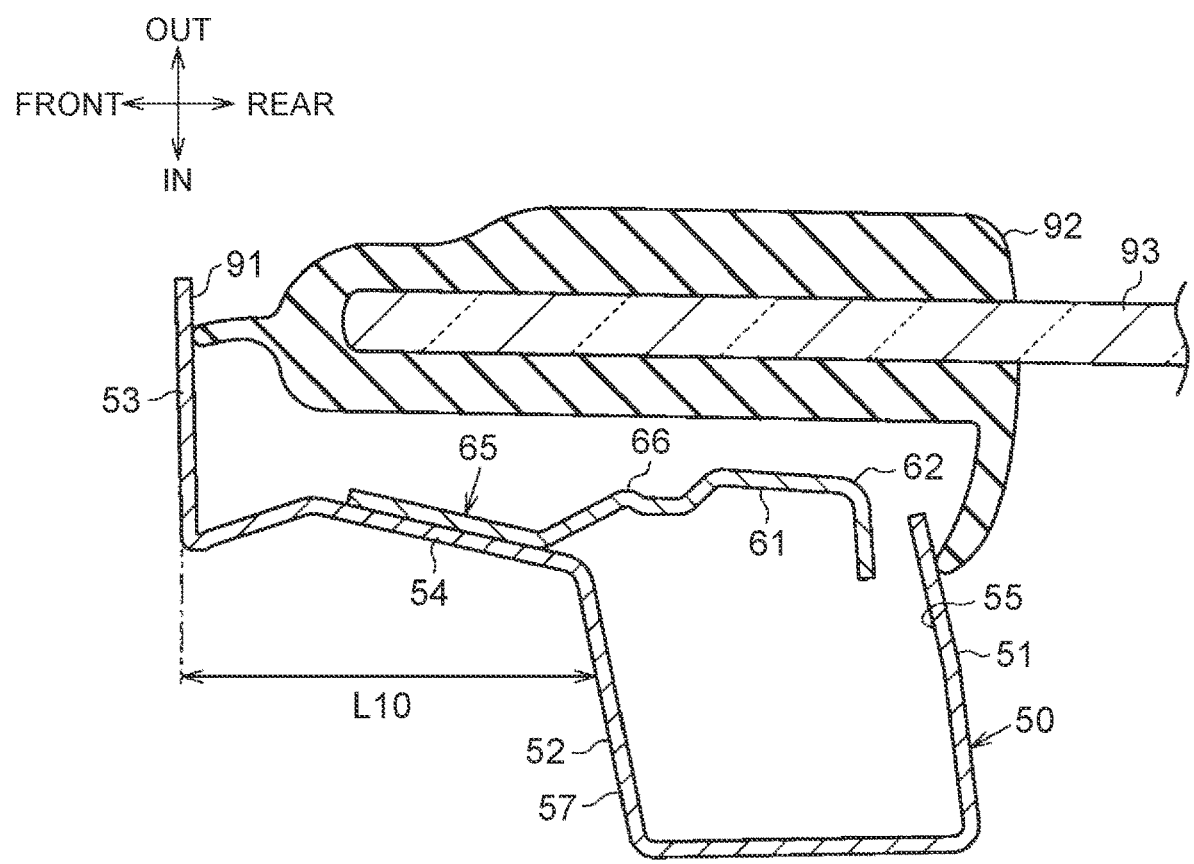
FIG. 8 is a sectional view taken along line VIII-VIII of FIG. 3, showing a window supporting portion and a fixed window supported by the window supporting portion.

As shown in FIG. 6, FIG. 7, and FIG. 8, the pillar 50 includes a first panel 51, a second panel 61 joined to the first panel 51. The first panel 51 and the second panel 61 are produced by press forming. The first panel 51 includes a first frame portion 52 extending in the up-down direction, a window supporting portion 53 provided more frontward than the first frame portion 52, and a coupling portion 54 coupling the first frame portion 52 to the window supporting portion 53. The first frame portion 52 projects toward the inside of the vehicle so as to form a recess 55. The first frame portion 52 extends from a position lower than a belt line L located at an upper end edge of the door body 21 to a position above the belt line L. The first panel 51 is joined to the inner panel 22 at a position lower than the belt line L. A lower portion of the first frame portion 52 is attached to a structural body such as a reinforcement. In the present embodiment, the lower portion of the first frame portion 52 is attached to the hinge reinforcement 27. The coupling portion 54 extends from a front end on the vehicle outer side of the first frame portion 52 toward the frontward direction. The window supporting portion 53 is formed by bending the first panel 51 toward the vehicle-outward direction at the front end of the coupling portion 54.

The second panel 61 is disposed at a more vehicle-outward position than the first panel 51. The second panel 61 is disposed so as to face the first frame portion 52. The second panel 61 includes a second frame portion 66 at a position facing the first frame portion 52. The second panel 61 extends from a position lower than the belt line L to a position above the belt line L. In the second panel 61, defining the portion upper than the belt line L as an upper portion 62, and defining the portion lower than the belt line L as a lower portion 63, the dimension in the front-rear direction of the upper portion 62 is shorter than the dimension in the front-rear direction of the lower portion 63. It can be said that the lower portion 63 includes an extended portion 64 that is extended more frontward in the front rear direction than the upper portion 62. The extended portion 64 is extended toward both sides of the front-rear direction.

Above the belt line L, the second panel 61 is joined to the coupling portion 54 of the first panel 51. Below the belt line L, the extended portion 64 of the second panel 61 is joined to the first panel 51. Specifically, above the belt line L, the first panel 51 and the second panel 61 are joined to each other at a position more frontward than the first frame portion 52 and the second frame portion 66, and on the other hand, below the belt line L, the first panel 51 and the second panel 61 are joined to each other on respective both sides in the front-rear direction of the first frame portion 52 and the second frame portion 66. The first panel 51 and the second panel 61 are joined to each other by welding.

The first panel 51 and the second panel 61 are joined to each other, to thereby configure a frame portion 57 by the first frame portion 52 of the first panel 51 and the second frame portion 66. At least a part of the frame portion 57 is formed to have a closed sectional shape in the up-down direction. Specifically, below the belt line L, a portion of the frame portion 57, to which the extended portion 64 is joined, is formed to have a closed sectional shape. The closed sectional shape exhibits such a shape that has a section closed in a direction orthogonal to the up-down direction in which the frame portion 57 extends. Even if a part of the section of interest includes partially a hole smaller than an outer circumferential length, such a shape is included in the closed sectional shape. The frame portion 57 is disposed at a more vehicle-inward position than the fixed window 93.

A front end of the upper sash 38 is connected to an upper end of the pillar 50 through joining. The frame portion 41 of the upper sash 38 is joined to the frame portion 57 of the pillar 50, and a channel portion 42 of the upper sash 38 is joined to the window supporting portion 53. The frame portion 57 extends downward from a connection position 58 between the upper sash 38 and the pillar 50.

The window supporting portion 53 and the coupling portion 54 are provided below the connection position 58 between the upper sash 38 and the pillar 50, as well as above the belt line L. The window supporting portion 53 is inclined such that the window supporting portion 53 is located more frontward as the window supporting portion 53 is located more downward. Hence, the window supporting portion 53 is located more frontward than the frame portion 57 as the window supporting portion 53 is located more downward, and a clearance distance L10 in the front-rear direction between the window supporting portion 53 and the frame portion 57 becomes gradually longer toward the downward direction. With the coupling portion 54, the window supporting portion 53 is coupled so as to extend frontward from the frame portion 57, at a position above the belt line L.

As shown in FIG. 3, a division bar 71 is provided in parallel to the rear sash 32. A lower end of the division bar 71 is fixed to the door body 21, and an upper end of the division bar 71 is fixed to the upper sash 38. The division bar 71 includes a frame portion 72 in a closed sectional shape, a fixed-window channel portion 73 that is disposed frontward of the frame portion 72 and supports a rear edge of a fixed window 93, and a lifting window channel portion 74 that is disposed rearward of the frame portion 72 and supports a front edge of the lifting window 83.

The rear sash 32, the upper sash 38, the division bar 71, and the door body 21 configure a lifting-window frame 81 to which the lifting window 83 is provided. The upper sash 38, the division bar 71, the pillar 50, and the door body 21 configure a window frame 91 to which the fixed window 93 is provided. It can be said that the door sash 31 partially configures the lifting-window frame 81 and the window frame 91.

As shown in FIG. 3, FIG. 4, and FIG. 5, the front door 20 includes a weather strip for lifting-window 82 so disposed as to surround the lifting-window frame 81 from the inside of the frame. The weather strip for lifting-window 82 is disposed between the lifting-window frame 81 and the lifting window 83 so as to seal both of them.

The lifting window 83 is supported by the channel portion 36 of the rear sash 32, the channel portion 42 of the upper sash 38, and the lifting-window channel portion 74 of the division bar 71. A rear edge of the lifting window 83 is supported by the channel portion 36 of the rear sash 32 via the weather strip for lifting-window 82. An upper edge of the lifting window 83 is supported by the channel portion 42 of the upper sash 38 via the weather strip for lifting-window 82. A front end of the lifting window 83 is supported by the lifting-window channel portion 74 of the division bar 71 via the weather strip for lifting-window 82. The lifting window 83 is able to be vertically lifted and lowered, that is, be openable and closeable with a not-illustrated lifting mechanism. Note that the window" described in the present specification may denote a so-called "window panel", and may be configured by glass, an acrylic board, or the like.

As shown in FIG. 8, the front door 20 includes a weather strip 92 so disposed as to surround the window frame 91 from the inside of the frame. The weather strip 92 is disposed between the window frame 91 and the fixed window 93 so as to seal both of them.

As shown in FIG. 3 and FIG. 8, the fixed window 93 is supported by the channel portion 42 of the upper sash 38, the window supporting portion 53, and the fixed-window channel portion 73 of the division bar 71. A rear edge of the fixed window 93 is supported by the fixed-window channel portion 73 of the division bar 71 via the weather strip 92. An upper edge of the fixed window 93 is supported by the channel portion 42 of the upper sash 38 and the window supporting portion 53 via the weather strip 92. A front end of the fixed window 93 is supported by the window supporting portion 53 via the weather strip 92. In the present embodiment, the fixed window 93 is a window that is supported by the window supporting portion 53. The front end of the fixed window 93 is supported, at a position more frontward than the frame portion 57, by the window supporting portion 53. The fixed window 93 is a fixed sash window, so that this window is not openable and closeable.

As shown in FIG. 8, above the belt line L, a joint portion 65 between the first panel 51 and the second panel 61 faces the weather strip 92 disposed on the window supporting portion 53, in the vehicle-width direction. The joint portion 65 between the first panel 51 and the second panel 61 includes a joined portion between the first panel 51 and the second panel 61 (i.e. the coupling portion 54 of the first panel 51, and a portion of the second panel 61, which is coupled to the coupling portion 54) and a boundary between the first panel 51 and the second panel 61.

Next, operation of the front door 20 according to the present embodiment will be described. Now, as indicated by two dot chain lines in FIG. 3, it is assumed that the front door 20 is not provided with the pillar 50, and the upper sash 38 is fixed to the door body 21. Usually, the upper sash 38 is produced by roll forming. The upper sash 38 produced by roll forming is a continuous body having a constant continuous shape, so that a clearance distance between the frame portion 41 and the channel portion 42 is constant across the entire length in the extending direction of the upper sash 38. That is, in the upper sash 38 produced by roll forming, the positional relationship between the frame portion 41 and the channel portion 42 is constant. If the front door 20 is not provided with the pillar 50 and the upper sash 38 is fixed to the door body 21, it is necessary to bend a part of the upper sash 38, and connect this bent portion 101 to a position more rearward than the front end of the door body 21. This is because a front wall 26 of the inner panel 22 is disposed at a position more rearward than the front end of the door body 21 for the purpose of securing a space for fixing the hinge 12, and thus it is necessary to dispose the frame portion 41 of the upper sash 38 at a position more rearward than the hinge 12 such that the front door 20 is turnable around the hinge 12 in this manner, in the case in which the upper sash 38 is connected to the position more rearward than the front end of the door body 21, the positional relationship between the frame portion 41 and the channel portion 42 in the upper sash 38 becomes constant, so that respective portions facing each other of the front pillar of the vehicle body 11 and the upper sash 38 are different from each other; thus, a gap is generated at a position frontward of the connection positon between the door body 21 and the upper sash 38. This gap is generated not only in the case in which the upper sash 38 is directly connected to the door body 21, but also in the case in which the upper sash 38 produced by roll forming is fixed to the door body 21, using the pillar with a constant clearance distance between the frame portion and the channel portion. This case requires an accessary component used for filling the gap and a bracket used for fixing this accessary component.

The front door 20 of the present embodiment includes the pillar 50, and the pillar 50 includes the frame portion 57 and the window supporting portion 53. The first panel 51 and the second panel 61 that configure the pillar 50 are produced by press forming, and the positional relationship between the frame portion 57 and the window supporting portion 53 may not be constant. Therefore, while the frame portion 57 is provided so as to extend in the up-down direction, the window supporting portion 53 can be inclined such that the window supporting portion 53 is located more frontward than the frame portion 57 as the window supporting portion 53 is located more downward. This configuration enables the window supporting portion 53 to be extended frontward without shifting the frame portion 57 frontward. Since the window supporting portion 53 is unlikely to rely on the position of the frame portion 57, the window supporting portion 53 can be formed in a shape corresponding to an edge portion of the door opening part 13 so as not to generate a gap between the vehicle body 11 and the window supporting portion 53. Because the fixed window 93 can be extended to a frontward position along the window supporting portion 53, a gap is unlikely to be generated between the front door 20 and the vehicle body 11.

Therefore, according to the above embodiment the following effects can be obtained. Even in the case in which the frame portion 57 is disposed to extend downward between the upper sash 38 and the belt line L, the window supporting portion 53 of the pillar 50 is located more frontward than the frame portion 57 as the window supporting portion 53 is located more downward. Compared with the case in which the positional relationship between the frame portion 57 and the window supporting portion 53 is constant, the fixed window 93 can be extended more frontward along the window supporting portion 53. A gap is unlikely to be generated between the front door 20 and the vehicle body 11. Accordingly, it is unnecessary to provide an accessary component used for filling the gap and a bracket used for fixing this accessary component.

The joint portion 65 between the first panel 54 and the second panel 61 faces the weather strip 92. The weather strip 92 makes the joint portion 65 between the first panel 51 and the second panel 61 inconspicuous from the outside. Therefore, it is possible to enhance design property of the front door 20.

Above the belt line L, the coupling portion 54 of the first panel 51 and the second panel 61 are joined to each other. The coupling portion 54 is located between the window supporting portion 53 and the first frame portion 52, and extends frontward from the first frame portion 52. Therefore, the coupling portion 54 is located adjacent to the frame portion 57 when the second panel 61 is disposed so as to face the first panel 51, and this portion is suitable for joining the second panel 61 to the first panel 51. In addition, above the belt line L, the second panel 61 is not joined to any other portions than the coupling portion 54. Hence, compared with the case in which the upper portion 62 of the second panel 61 is joined to another portion in addition to the coupling portion 54, it is possible to reduce the dimension in the front-rear direction of the upper portion 62. That is, in the second panel 61, it is possible to reduce a portion of the second panel 61 that projects more upward than the belt line L.

Accordingly, compared with the case in which the upper portion 62 of the second panel 61 is joined to another portion in addition to the coupling portion 54, an area to be joined can be reduced. Besides, the dimension in the front-rear direction of the upper portion 62 can be shorter than the dimension in the front-rear direction of the lower portion 63. Accordingly, it is possible to reduce the manufacturing cost.

Below the belt line L, the extended portion 64 of the second panel 61 is joined to the first panel 51. This configuration allows the frame portion 57 to be formed in a closed sectional shape, below the belt line L. Accordingly, the frame portion 57 is allowed to have an enhanced rigidity.

The door sash 31 is produced as a roll forming product, and the pillar 50 is produced as a press forming product. That is, a press forming product is partially used. With this configuration, compared with the case in which the door sash 31 is produced as a press forming product, it is possible to reduce increase in manufacturing cost.

The above-described embodiment may be changed as follows. The joint position between the first panel 51 and the second panel 61 may appropriately be changed. For example, instead of joining the second panel 61 to the coupling portion 54 of the first panel 51, the extended portion 64 of the second panel 61 may be joined to the first panel 51. Moreover, the second panel 61 may be joined to the coupling portion 54 of the first panel 51, but the extended portion 64 of the second panel 61 may not be joined to the first panel 51.

The upper portion 62 of the second panel 61 may be joined to the first frame portion 52 at a position more rearward than the coupling portion 54 so as to configure a closed section in cooperation with the first frame portion 52. That is, the frame portion 57 may have a closed sectional shape at a position above the belt line L. In this case, joining between the upper portion 62 of the second panel 61 and the first frame portion 52 is carried out by arc-welding, for example. Besides, it may be configured that the first panel 51 and the second panel 61 are provided with portions overlapping each other at a position above the belt line L, and these portions are spot-welded so as to form the frame portion 57 in a closed sectional shape.

The joint portion 65 between the first panel 51 and the second panel 61 may not face the weather strip 92. In some embodiments, a ceramic pigment or the like is applied onto a surface on the vehicle-inner side of the fixed window 93 so as to make the joint portion 65 between the first panel 51 and the second panel 61 inconspicuous.

The window supporting portion 53 of the pillar 50 may support the lifting window 83. In this case, the front door 20 does not include the fixed window 93 and the division bar 71, but includes only the lifting window 83 as a window.

The first panel 51 and the second panel 61 may be produced by a different producing method from press forming. The rear sash 32 and the upper sash 38 may be extrusion molding products.

The pillar 50 may be configured by only the first panel 51. The frame portion 57 may have a shape different from the closed sectional shape. The front door 20 may be provided with an accessary component if this accessary component is other than on accessary component used for filling the gap between the front door 20 and the vehicle body 11.

What is claimed is:

1. A front door comprising:
   a door body;
   a door sash provided above the door body, the door sash at least partially defines a window frame;
   a fixed window disposed in the window frame;
   a weather strip disposed between the window frame and the fixed window; and
   a pillar having an upper end connected to a front end of an upper sash of the door sash, the upper sash supporting an upper edge of the fixed window, the pillar having a lower portion fixed to the door body, wherein:
   the pillar includes:
      a frame portion extending downward from a connection position between the upper sash and the pillar,
      a window supporting portion coupled to the frame portion above an upper end of the door body so as to extend frontward from the frame portion, the window supporting portion being located more frontward than the frame portion as the window supporting portion extends downward, and the window supporting portion engages the weather strip,
      a first panel that has a first frame portion forming a part of the frame portion, and
      a second panel that has a second frame portion forming a part of the frame portion, the second panel joined to the first panel such that the second frame portion is disposed facing the first frame portion,
   a front end of the fixed window is supported by the window supporting portion at a position more frontward than the frame portion,
   above the upper end of the door body, a joint portion between the first panel and the second panel faces the weather strip,
   the first panel includes a coupling portion that couples the first frame portion to the window supporting portion, and
   the second panel is joined to the coupling portion at a position above the upper end of the door body.

2. The front door according to claim 1, wherein
   the second panel includes an extended portion extending in a front-rear direction of the front door at a position lower than the upper end of the door body, and
   the extended portion is joined to the first panel such that the frame portion has a closed cross-sectional shape.

3. The front door according to claim 1, wherein
   the second panel includes an extended portion at a position lower than the upper end of the door body, and
   the extended portion is joined to the first panel such that the frame portion has a closed cross-sectional shape.

* * * * *